(12) United States Patent
Carnevali (10) Patent No.: US 8,201,788 B2
(45) Date of Patent: Jun. 19, 2012

(54) SIDE ARM CLAMP ASSEMBLY

(76) Inventor: Jeffrey D. Carnevali, Seattle, WA (US)

( * ) Notice: Subject to any disclaimer, the term of this patent is extended or adjusted under 35 U.S.C. 154(b) by 336 days.

(21) Appl. No.: 12/455,245

(22) Filed: May 29, 2009

(65) Prior Publication Data

US 2010/0301183 A1    Dec. 2, 2010

(51) Int. Cl.
*A47B 91/00* (2006.01)
(52) U.S. Cl. ............... 248/223.41; 248/918; 248/316.7; 248/510
(58) Field of Classification Search .......... 248/510, 248/918, 316.1, 316.3, 316.5, 316.7, 220.21, 248/223.41, 224.61, 225.11, 224.8, 222.11
See application file for complete search history.

(56) References Cited

U.S. PATENT DOCUMENTS

| | | | |
|---|---|---|---|
| 4,957,264 A * | 9/1990 | Hakanen | 248/510 |
| 6,491,268 B1 * | 12/2002 | Channer et al. | 248/176.1 |
| 6,585,212 B2 * | 7/2003 | Carnevali | 248/346.07 |
| 6,621,704 B1 * | 9/2003 | Liu | 361/704 |
| 6,817,587 B2 * | 11/2004 | Lin | 248/346.04 |
| 6,896,046 B2 * | 5/2005 | Lee et al. | 165/185 |
| 7,032,872 B2 * | 4/2006 | Sullivan | 248/346.07 |
| 7,544,889 B1 * | 6/2009 | Sanchez | 174/58 |
| 7,551,458 B2 * | 6/2009 | Carnevali | 361/807 |

* cited by examiner

*Primary Examiner* — Terrell McKinnon
*Assistant Examiner* — Steven Marsh
(74) *Attorney, Agent, or Firm* — Charles J. Rupnick (57) ABSTRACT

A side arm clamp assembly is formed of a molded body having a clip receiver slot, a retention clip formed of a retention portion and an insertion portion that is slidingly receivable into the clip receiver slot. A detent is provided between the clip receiver slot and the insertion portion of the retention clip received thereinto. Means are provided for securing the molded body relative to an electronics platform with the retention portion of the retention clip projected over a mounting surface thereof.

16 Claims, 7 Drawing Sheets

SIDE ARM CLAMP ASSEMBLY

FIELD OF THE INVENTION

The present invention relates generally to side arm clamp assemblies for trays for holding portable devices, and in particular to side arm clamp assemblies for quick release docking stations for portable computers and the like.

BACKGROUND OF THE INVENTION

Many after-market accessories being added in automobiles require specially designed mounting platforms that can accommodate the limited available space normally found in a vehicle for mounting add-on equipment. These mounting platforms must be able to handle the load of the accessory device in the vibration and shock environment encountered in a moving vehicle while still permitting the accessory device to be quickly and easily installed in the mounting platform. The mounting platforms must accommodate the various shapes of accessory devices being installed, while conforming to the limited, generally oddly-shaped space available in which to mount the platform and the accessory device. Various mounting platforms are currently in use of different configurations that mount either on the vehicle's center console or dash board.

Generally, the currently known mounting platforms utilize side arm clamps that are of a single solitary structure. This single-piece design greatly increases manufacturing costs.

SUMMARY OF THE INVENTION

The present invention is a novel side arm clamp assembly for installation on a mounting platform.

According to one aspect of the invention the novel side arm clamp assembly is formed of a molded body having a clip receiver slot, a retention clip formed of a retention portion and an insertion portion that is slidingly receivable into the clip receiver slot. A detent is provided between the clip receiver slot and the insertion portion of the retention clip received thereinto. Means are provided for securing the molded body relative to an electronics platform with the retention portion of the retention clip projected over a mounting surface thereof.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
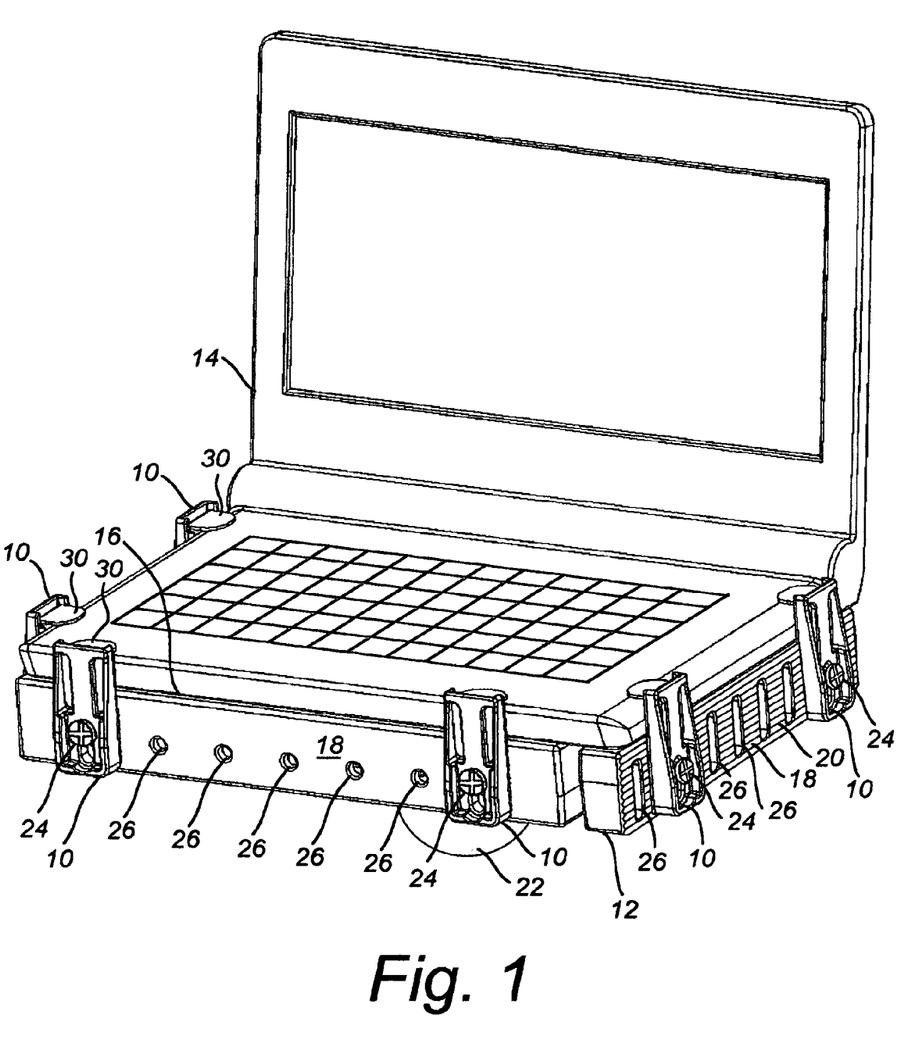
FIG. 1 illustrates a novel side arm clamp assembly installed on a mounting platform.

FIG. 1 illustrates a novel side arm clamp 10 installed on an electronics mounting platform 12. Mounting platform 12 is for example, a known type of mounting platform for various vehicle-mounted, after-market accessory electronics devices 14, such as a portable laptop computer (shown) or tablet computer, a cellular telephone, a global positioning system (GPS) receiver, or another useful accessory electronics device. By example and without limitation, mounting platform 12 is, for example, a tray having slidingly interconnected frame members (shown) of the type disclosed by U.S. Pat. No. 6,585,212, the complete disclosure of which is incorporated herein by reference. As illustrated, mounting platform 12 is formed with a device mounting surface 16 structured for receiving thereon accessory electronics device 14, and with multiple front and side clamping surfaces 18. One or more of front and side clamping surfaces 18 may be optionally structured with surface features 20 for more securely positioning side arm clamps 10 relative to platform 12. By example and without limitation, surface features 20 are optionally structured as striations oriented lengthwise of clamping surfaces 18 and substantially parallel with device mounting surface 16. Structure 22 is provided for mounting the platform 12 in a vehicle, such as an automobile, airplane, or boat. By example and without limitation, structure 22 is, for example, a coupler having a part spherical head (shown) formed of a resiliently compressible material of the type disclosed by U.S. Pat. No. 5,845,885, the complete disclosure of which is incorporated herein by reference.

Each side arm clamp 10 is stably coupled to one of front and side clamping surfaces 18. For example, fasteners 24, such as screws or other threaded fasteners, are received through side arm clamps 10 into mating fastener receivers 26, such as matingly threaded holes or slotted apertures for mating nuts, formed in respective front and side clamping surfaces 18 of mounting platform 12.

Figure 2:
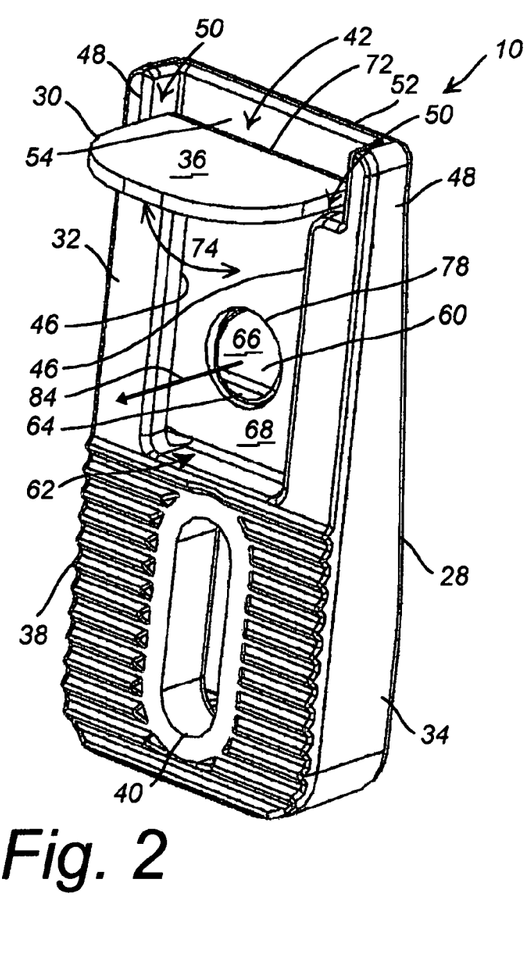
FIG. 2 and FIG. 3 are opposing views of the novel side arm clamp assembly.
Figure 3:
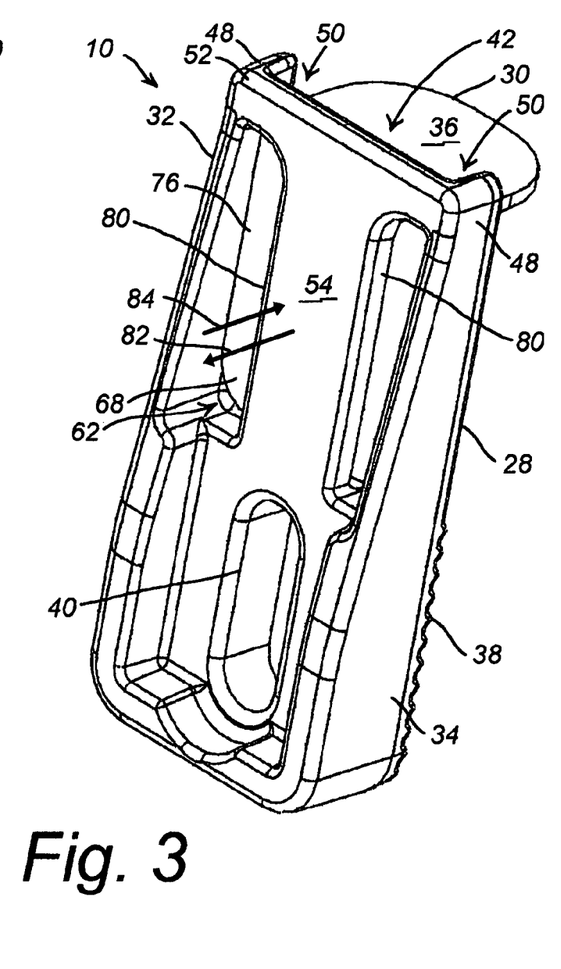

FIG. 2 and FIG. 3 are opposing views of side arm clamp 10. Side arm clamp 10 is an assembly of a retention body 28 with a substantially rigid retention clip 30. Retention body 28 is molded, for example, of any injection moldable plastic, nylon, composite or metal material. Retention body 28 is thus manufactured easily and inexpensively as individual units of relatively rigid molded plastic, nylon, composite or metal parts. Retention body 28 is molded with a receiver portion 32 and a positioning portion 34. As shown here, according to one embodiment, receiver and positioning portions 32, 34 are substantially linearly aligned, one above the other.

Positioning portion 34 of retention body 28 includes a means for positioning side arm clamp 10 relative to one of clamping surfaces 18 with a retention portion 36 of retention clip 30 projected above mounting surface 16 of electronics mounting platform 12. By example and without limitation, positioning portion 34 of retention body 28 is molded with one or more surface features 38 structured to interlockably engage mating surface features 20 on clamping surfaces 18 of mounting platform 12. For example, surface features 38 are optionally structured as mating striations oriented substantially crosswise of retention body 28 and structured to interlockably engage mating striations 19 on clamping surfaces 18, as illustrated in FIG. 1. Retention body 28 is further molded with an aperture 40 sized to receive therethrough a shaft portion of fasteners 24 for securing side arm clamp 10 to clamping surfaces 18 of mounting platform 12 with surface features 38 interlockably engaged with mating surface features 20, when present.

Receiver portion 32 of retention body 28 is molded with a receiver slot 42 formed of a pair of substantially continuous spaced-apart receiver grooves 46 opposing one another between a pair of spaced-apart shoulders 48. Shoulders 48 are formed with opposing grooves 46 formed with respective openings 50 thereinto adjacent to an end 52 of receiver portion 32 of retention body 28 distal from the positioning portion 34. A flexibly resilient back plate 54 is molded between spaced-apart shoulders 48, back plate 54 having an interior surface 56 forming an inner wall of grooves 46, shown in subsequent Figures.

According to one embodiment, a resilient catch 60 of back plate 54 is flexibly projected at least partially into an interior space 62 of receiver slot 42 between opposing grooves 46. Resilient catch 60 is molded with a barb 64 having an approach portion 66 intersecting interior surface 56 of back plate 54 adjacent to openings 50 into opposing grooves 46 and inclined away from interior surface 56 of back plate 54 and into interior space 62 between opposing grooves 46.

Retention clip 30 is a substantially rigid having an upright insertion portion 68 with retention portion 36 projected crosswise therefrom adjacent to one end 72 thereof. For example, retention portion 36 of retention clip 30 is projected at substantially a right angle 74 from insertion portion 68. Insertion portion 68 is formed with a pair of side tongue portions 76 spaced-apart to be simultaneously slidingly received into spaced-apart grooves 46 formed by receiver slot 42 of receiver portion 32 of retention body 28. According to one embodiment, when back plate 54 of retention body 28 is formed with resilient catch 60, insertion portion 68 of retention clip 30 is formed with a mating catch receiver 78 spaced between side tongue portions 76 and structured to substantially permanently interlockably receive thereinto barb portion 64 of resilient catch 60.

According to one embodiment receiver portion 32 of retention body 28 is molded with opposing reliefs 80 between back plate 54 and respective shoulders 48. Reliefs 80 permit back plate 54 to more resiliently flex during insertion portion 68 of retention clip 30 into receiver slot 42 between the pair of opposing grooves 46. Flexion of back plate 54 permits barb 64 of resilient catch 60 to be pushed outwardly (arrow 82) of interior space 62 of receiver slot 42 to permit passage of insertion portion 68 of retention clip 30 into receiver slot 42 into a position adjacent to positioning portion 34 of side arm retention body 28.

Resiliency of back plate 54 permits barb 64 of resilient catch 60, upon encountering mating catch receiver 78 of retention clip 30, to spring inwardly (arrow 84) back into its nominal position projected into interior space 62 of receiver slot 42 between opposing grooves 46. Insertion portion 68 of rigid retention clip 30 thus flexibly pushes barb 64 of resilient catch 60 out of interior space 62 of receiver slot 42 during insertion. When insertion portion 68 is seated adjacent to positioning portion 34 of side arm retention body 28, barb 64 encounters mating catch receiver 78. Then, the resiliency of back plate 54 causes barb 64 to snap back into interior space 62 of receiver slot 42 and into engagement with mating catch receiver 78. Retention clip 30 is thereafter securely interlocked with retention body 28 for forming side arm clamp assembly 10.

Figure 4:
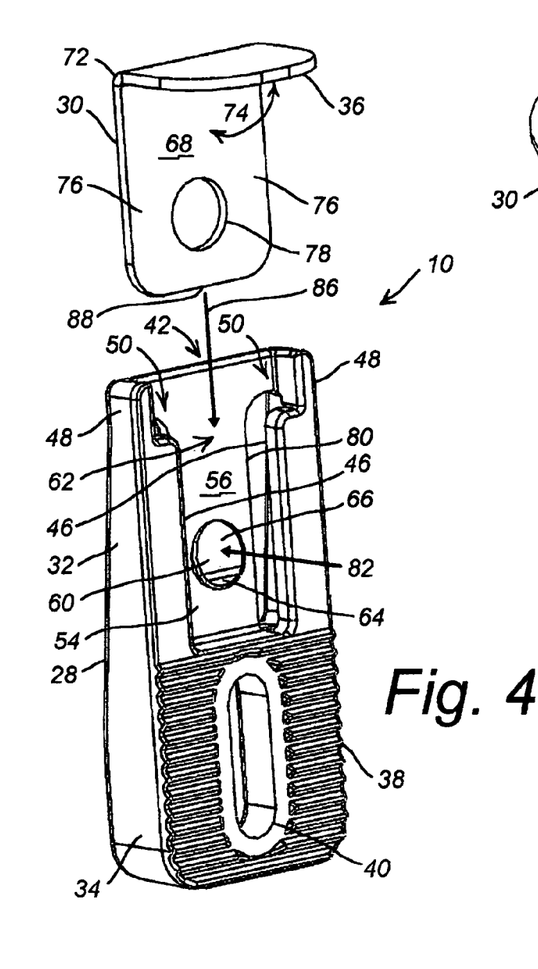
FIG. 4 and FIG. 5 illustrate assembly of the novel side arm clamp.
Figure 5:
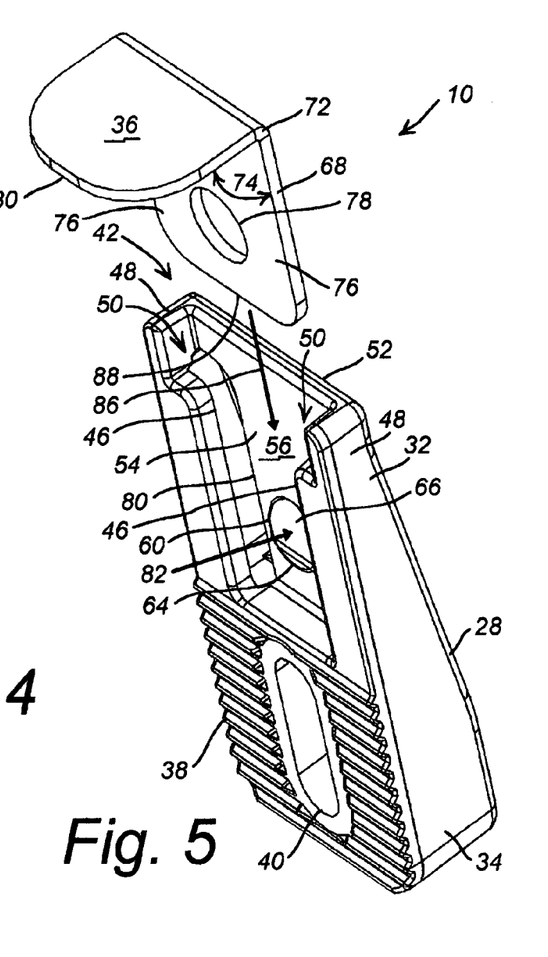

FIG. 4 and FIG. 5 are opposing views of side arm clamp 10 that illustrate assembly of substantially rigid retention clip 30 with molded retention body 28. As indicated (arrow 86), rigid insertion portion 68 of retention clip 30 enters substantially linearly into receiver slot 42 formed by receiver portion 32 of retention body 28. With retention portion 36 of retention clip 30 facing inwardly of retention body 28, side tongue portions 76 of insertion portion 68 pass through openings 50 adjacent to receiver portion end 52 and engage opposing spaced-apart grooves 46. Travel along insertion direction (arrow 86) causes insertion portion 68 to enter interior space 62 of receiver slot 42 between opposing grooves 46, which interior space 62 is at least partially blocked by resilient catch 60 of back plate 54 flexibly projected thereinto. An end portion 88 of insertion portion 68 first encounters approach portion 66 of catch 60, which intersects interior surface 56 of back plate 54 adjacent to openings 50 of opposing grooves and inclines away from interior surface 56 of back plate 54. Inclination of approach portion 66 permits end portion 88 to push barb 64 of resilient catch 60 outwardly (arrow 82) of interior space 62 of receiver slot 42, which permits insertion end portion 88 to pass barb 64 into a position within receiver slot 42 adjacent to positioning portion 34 of side arm retention body 28.

Figure 6:
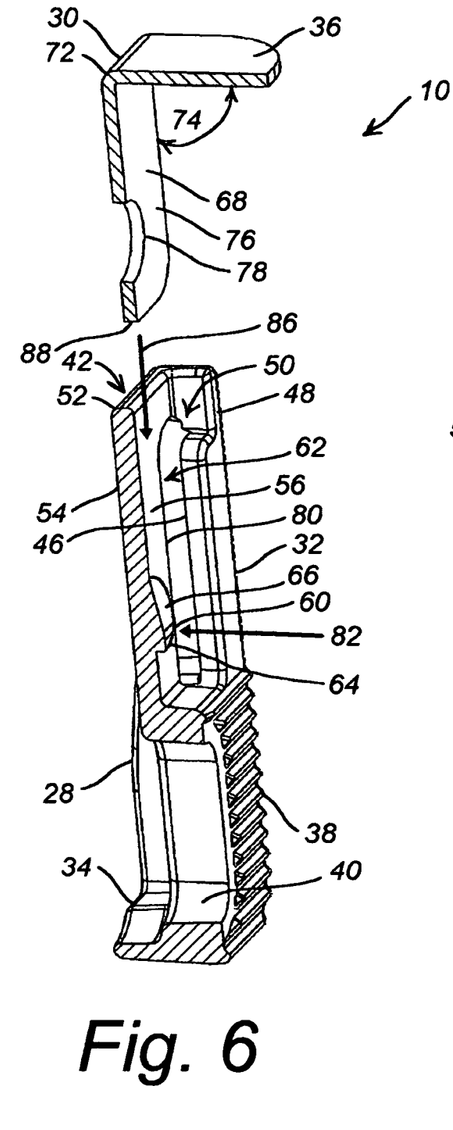
FIG. 6 is an assembly cross-section view of the novel side arm clamp.

FIG. 6 is an assembly cross-section view of side arm clamp 10. According to one embodiment, approach portion 66 and barb 64 of catch 60 are molded integrally as a single piece with back plate 54 of retention body 28.

Figure 7:
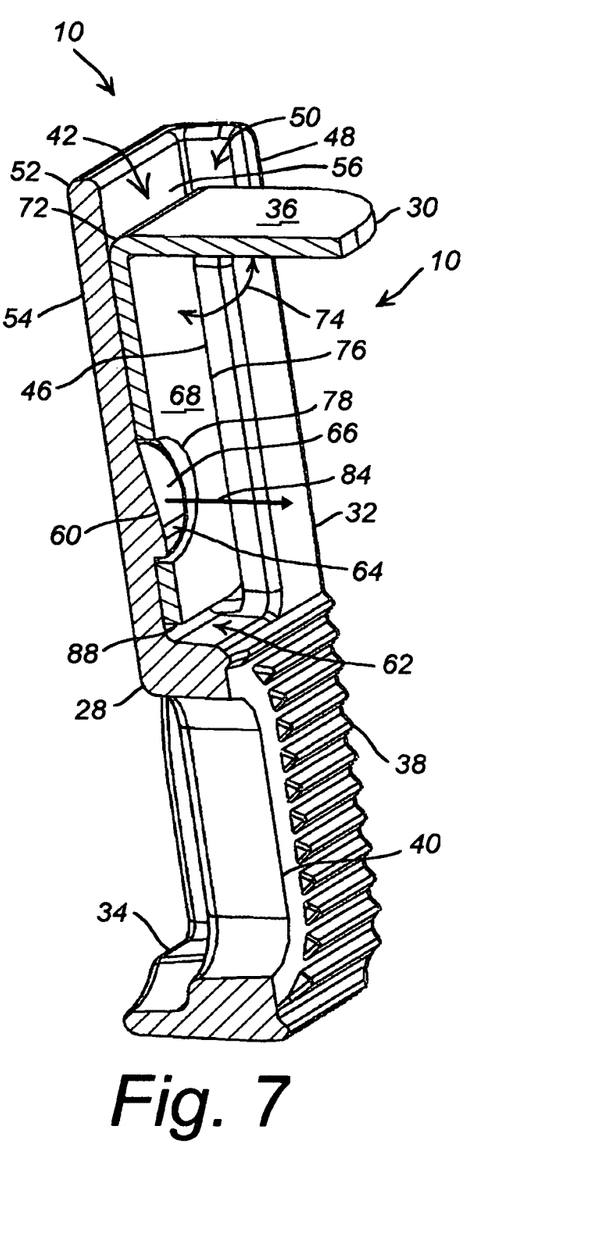
FIG. 7 is a cross-section view of the novel side arm clamp assembly.

FIG. 7 is a cross-section view of side arm clamp assembly 10. When retention clip 30 is assembled with molded retention body 28, end portion 88 of insertion portion 68 rests in receiver slot 42 adjacent to positioning portion 34 and substantially fills its interior space 62. Insertion portion 68 is positioned in receiver slot 42 by substantially permanent interlocking engagement of catch 60 with mating catch receiver 78. According to one embodiment, when mating catch receiver 78 of retention clip 30 is positioned over resilient catch 60, resiliency of back plate 54 causes barb 64 to spring inwardly (arrow 84) back into its nominal position projected into interior space 62 of receiver slot 42 and into engagement with mating catch receiver 78. Retention clip 30 is thereafter securely interlocked with retention body 28 for forming side arm clamp assembly 10.

Figure 8:
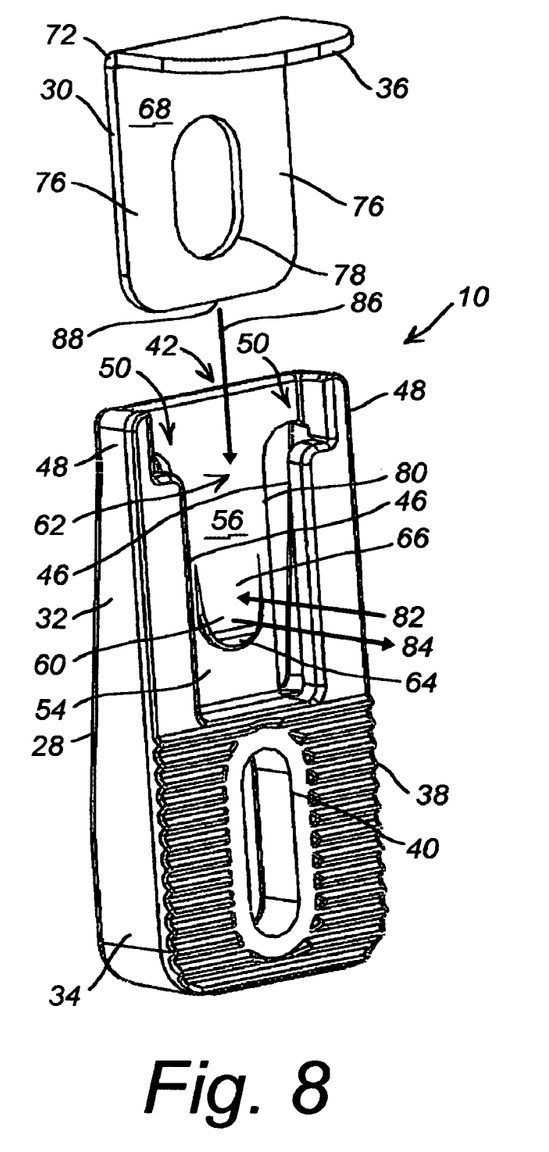
FIG. 8 illustrates assembly of one alternative embodiment of the novel side arm clamp.

FIG. 8 illustrates one alternative embodiment of side arm clamp 10 wherein catch 60 is movably resiliently suspended from back plate 54 of molded retention body 28. Here, back plate 54 may be stiff because catch 60 is flexibly movable outwardly (arrow 82) of interior slot space 62 when inclined approach portion 66 is engaged by insertion end portion 88 during insertion of insertion portion 68 of retention clip 30. Resiliency of flexibly movable catch 60 causes barb 64 to spring inwardly (arrow 84) back into its nominal position projected into interior space 62 of receiver slot 42 and into engagement with mating catch receiver 78. Accordingly, reliefs 80 between back plate 54 and respective shoulders 48 are optionally omitted. Mating catch receiver 78 of retention clip 30 is appropriately adapted to receive suspended catch 60, for example, as oblong aperture (shown).

Figure 9:
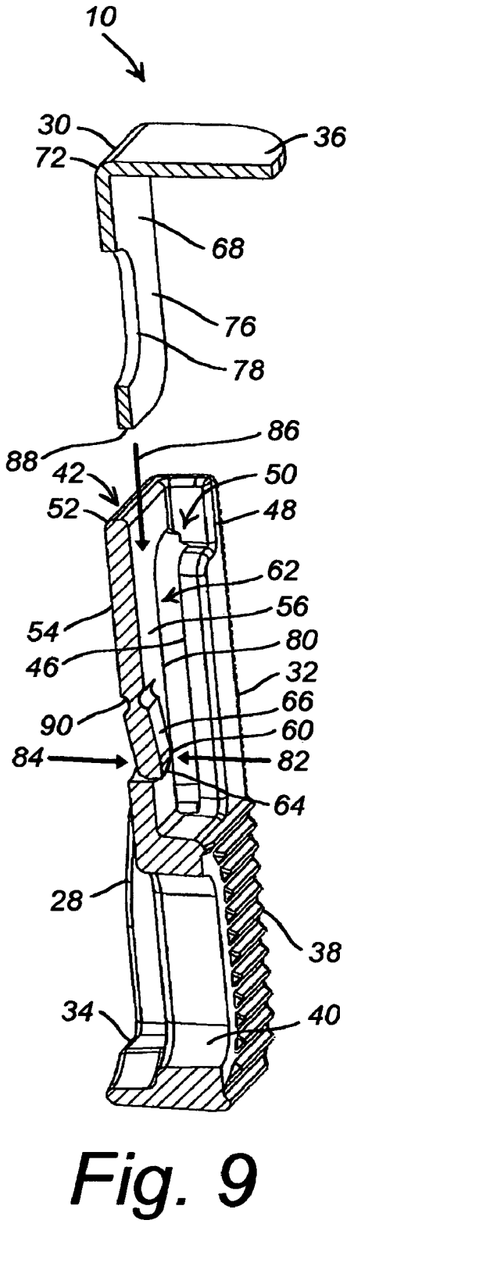
FIG. 9 illustrates assembly of an alternative embodiment of the novel side arm clamp.

FIG. 9 is a cross-section view of side arm clamp 10 wherein catch 60 is movably resiliently suspended from back plate 54 of molded retention body 28. Here, an optional hinge 90 is molded between catch 60 and back plate 54 such that catch 60 is more easily movable out of interior slot space 62 when inclined approach portion 66 is engaged by insertion end portion 88 during insertion of insertion portion 68 of retention clip 30.

Figures 10, 11:
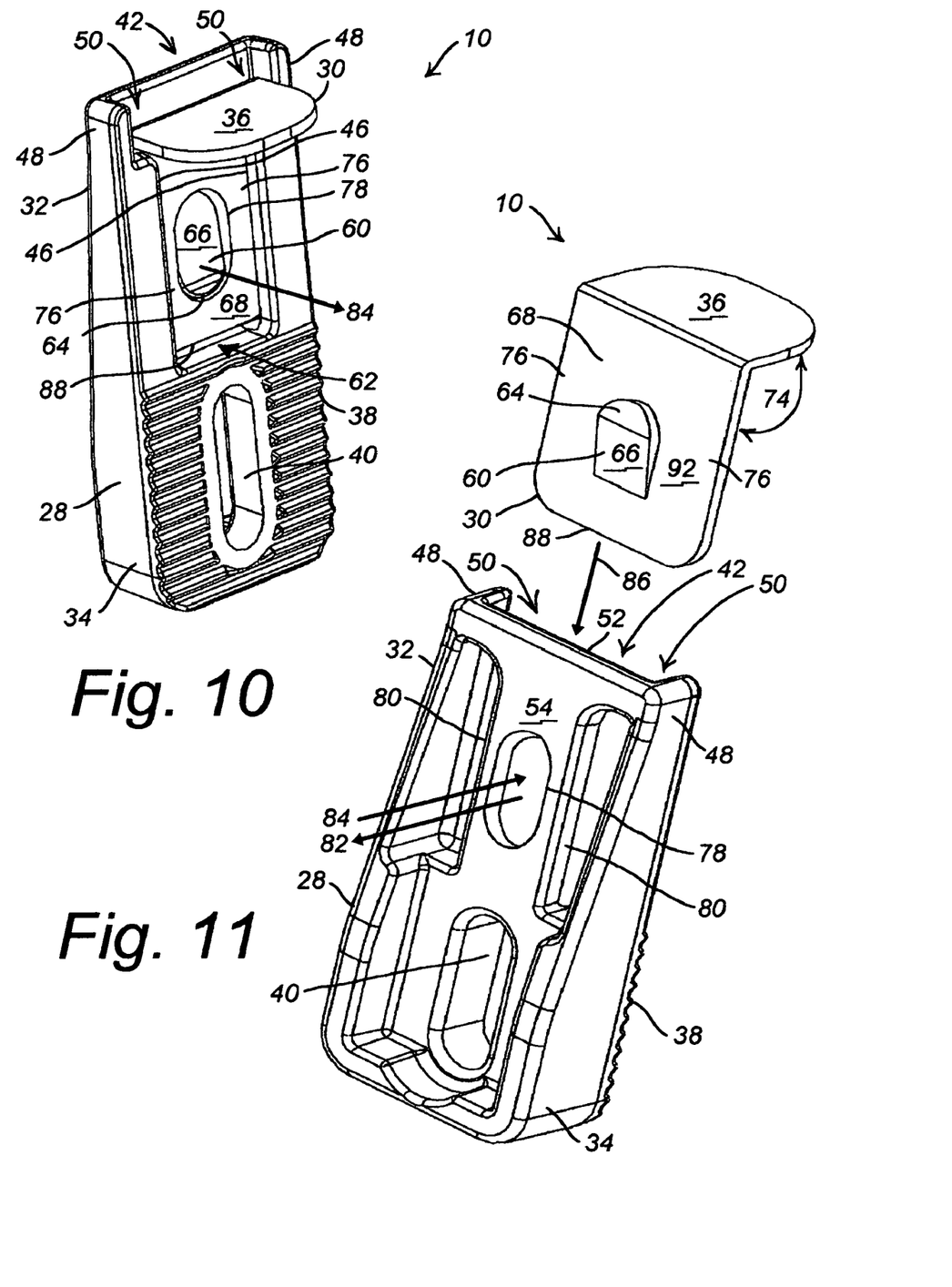
FIG. 10 illustrates an alternative embodiment of the novel side arm clamp assembly.
FIG. 11 illustrates assembly of an alternative embodiment of the novel side arm clamp.

FIG. 10 illustrates side arm clamp assembly 10 having insertion portion 68 of retention clip 30 inserted into interior slot space 62 with side tongue portions 76 received into spaced-apart grooves 46. During installation, end portion 88 of insertion portion 68 first encounters approach portion 66 of catch 60 and flexibly pushes barb 64 outwardly (arrow 82) of interior space 62 to permit passage of insertion portion 68 into receiver slot 42. For example, catch 60 rotates about hinge 90, when present, outwardly (arrow 82) of back plate 54 when pressed by end portion 88 of insertion portion 68. When resilient catch 60 encounters mating catch receiver 78, barb 64 resiliently snaps back into interior space 62 of receiver slot 42 and into engagement with mating catch receiver 78. Retention clip 30 is thereafter securely interlocked with retention body 28 for forming side arm clamp assembly 10.

FIG. 11 is an assembly that illustrates one alternative embodiment of side arm clamp 10 wherein catch 60 is rigidly projected outwardly from exterior surface 92 of insertion portion 68 of rigid retention clip 30. Here, back plate 54 of molded retention body 28 is molded with mating catch receiver 78 spaced between spaced-apart side grooves 46. Engagement of approach portion 66 with end 52 of receiver portion 32 pushes back plate 54 outwardly (arrow 82) of interior space 62 to permit passage of insertion portion 68 of retention clip 30 into receiver slot 42.

Figure 12:
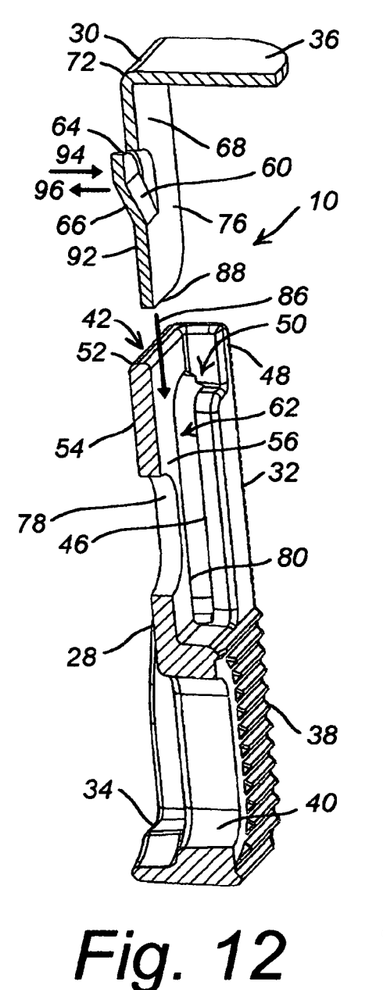
FIG. 12 illustrates assembly of an alternative embodiment of the side arm clamp.

FIG. 12 is an assembly cross-section view of side arm clamp 10. According to one embodiment, catch 60 is movably resiliently suspended from insertion portion 68 of rigid retention clip 30. Here, back plate 54 may be stiff because catch 60 is flexibly movable inwardly (arrow 94) of interior slot space 62 when inclined approach portion 66 is engaged by end 52 of receiver portion 32 during insertion of insertion portion 68 of retention clip 30. Resiliency of flexibly movable catch 60 causes barb 64 to spring outwardly (arrow 96) back into its nominal position projected outwardly of exterior surface 92 of insertion portion 68.

Figure 13:
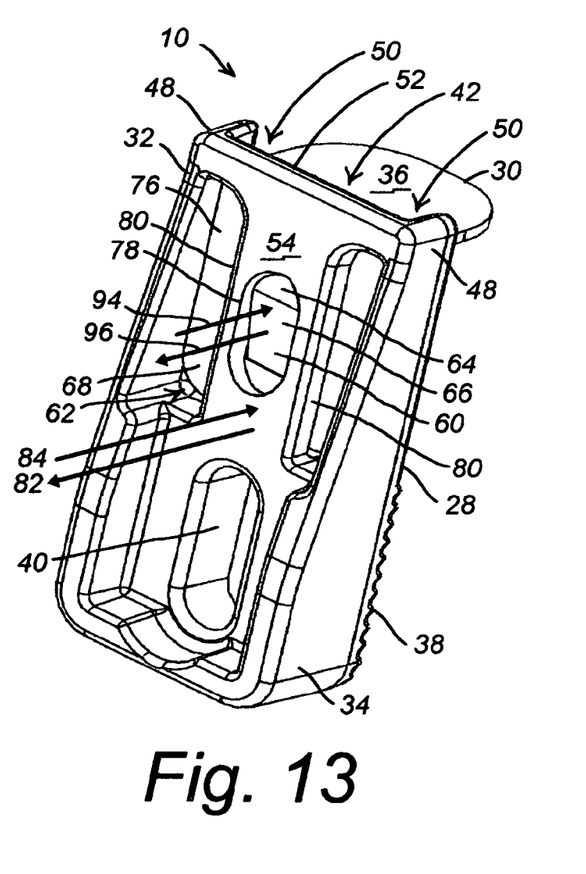
FIG. 13 illustrates an alternative embodiment of the novel side arm clamp assembly.

FIG. 13 illustrates side arm clamp assembly 10 having insertion portion 68 of retention clip 30 inserted into interior slot space 62 with side tongue portions 76 received into spaced-apart grooves 46. When catch 60 is rigidly projected outwardly from exterior surface 92 of insertion portion 68 (FIG. 11), during installation of retention clip 30 engagement of catch approach portion 66 with end 52 of receiver portion 32 pushes back plate 54 outwardly (arrow 82) of interior space 62 to permit passage of insertion portion 68 of retention clip 30 into receiver slot 42. When end portion 88 of insertion portion 68 is seated adjacent to positioning portion 34 of side arm retention body 28, barb 64 of catch 60 engages mating catch receiver 78 of back plate 54. Then, the resiliency of back plate 54 causes mating catch receiver 78 to snap back (arrow 84) toward interior space 62 of receiver slot 42 and into engagement with barb 64. Retention clip 30 is thereafter securely interlocked with retention body 28 for forming side arm clamp assembly 10.

Alternatively, when catch 60 is movably resiliently suspended from insertion portion 68 (FIG. 12), during installation of rigid retention clip 30 engagement of inclined catch approach portion 66 with end 52 of receiver portion 32 pushes barb 64 of catch 60 flexibly inwardly (arrow 94) of interior slot space 62. Insertion portion 68 of retention clip 30 is thereby permitted. Resiliency of flexibly movable catch 60 causes barb 64 to spring outwardly (arrow 96) back into its nominal position projected outwardly of exterior surface 92 of insertion portion 68 into engagement with mating catch receiver 78. Retention clip 30 is thereafter securely interlocked with retention body 28 for forming side arm clamp assembly 10.

Additionally, when catch 60 is movably resiliently suspended from insertion portion 68 (FIG. 12), resiliency of flexibly movable catch 60 causes barb 64 to spring outwardly (arrow 96) back into its nominal position projected outwardly of exterior surface 92 of insertion portion 68. Barb 64 is thus projected outwardly of interior space 62 of receiver slot 42 and into engagement with mating catch receiver 78 in back plate 54. Accordingly, resiliency of back plate 54 is not required, and reliefs 80 between back plate 54 and respective shoulders 48 are optionally omitted. Mating catch receiver 78 of side arm retention body 28 is appropriately adapted to receive suspended catch 60, for example, as oblong aperture (shown).

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A side arm clamp assembly, comprising:
   a molded body comprising a clip receiver slot further comprising a back plate between a pair of receiver grooves, wherein the back plate is further resiliently flexible relative to the pair of grooves;
   a substantially rigid retention clip comprising a retention portion and an insertion portion slidingly receivable into the receiver grooves of the clip receiver slot;
   a detent between the back plate of the clip receiver slot and the insertion portion of the retention clip received thereinto; and
   means for securing the molded body relative to a device mounting platform with the retention portion of the retention clip projected over a mounting surface thereof.

2. The assembly of claim 1, wherein the clip receiver slot further comprises a pair of opposing receiver grooves; and
   wherein the retention clip further comprises a pair of spaced-apart side tongue portions sized to be slidingly received into the opposing receiver grooves.

3. The assembly of claim 1, wherein the detent further comprises a catch formed in one of the back plate of the clip receiver slot and the insertion portion of the retention clip received thereinto, and a mating catch receiver formed in a different one of the back plate and the insertion portion.

4. The assembly of claim 3, wherein the catch is further formed in the back plate of the clip receiver slot; and
   the mating catch receiver is further formed in the insertion portion of the retention clip.

5. A side arm clamp assembly, comprising:
   a molded body comprising a clip receiver slot, wherein the clip receiver slot further comprises a pair of opposing receiver grooves and a back plate between the pair of receiver grooves, wherein the back plate further comprises a substantially flexible portion between the pair of receiver grooves;
   a retention clip comprising a retention portion and an insertion portion comprising a pair of spaced-apart side tongue portions sized to be slidingly receivable into the clip receiver slot, wherein the insertion portion further comprises a substantially rigid portion of the retention clip;

a detent positioned between the back plate of the clip receiver slot and the insertion portion of the retention clip received thereinto, wherein the detent further comprises a catch formed in one of the back plate of the clip receiver slot and the insertion portion of the retention clip received thereinto, and a mating catch receiver formed in a different one of the back plate and the insertion portion; and means for securing the molded body relative to a device mounting platform with the retention portion of the retention clip projected over a mounting surface thereof.

6. The assembly of claim 3, wherein the catch is further formed in the insertion portion of the retention clip; and the mating catch receiver is further formed in the back plate of the clip receiver slot.

7. The assembly of claim 6, wherein the catch is further resiliently flexible in the insertion portion of the retention clip.

8. A side arm clamp assembly, comprising:

a molded body substantially formed of a moldable material, the body comprising a clip receiver portion and a positioning portion, the clip receiver portion further comprising a clip receiver slot comprising a pair of opposing continuous spaced-apart grooves each comprising an opening thereinto adjacent to an end of the receiver portion of the body, and a back plate formed between the pair of grooves, wherein the back plate is further substantially resiliently flexible relative to the pair of grooves;

a substantially rigid retention clip comprising an insertion portion and a retention portion angularly projected therefrom, the insertion portion further being slidingly received into the pair of spaced-apart grooves of the clip receiver slot;

a catch and a mating catch receiver positioned between the back plate of the clip receiver slot and the insertion portion of the retention clip; and means for positioning the molded body relative to a device mounting platform with the retention portion of the retention clip projected above a mounting surface thereof.

9. The assembly of claim 8, wherein the catch is further resiliently flexible relative to the mating catch receiver.

10. The assembly of claim 8, wherein catch further comprises a barb projected from the back plate at least partially into a space between the pair of grooves; and the mating catch receiver further comprises a mating barb receiver positioned in the insertion portion of the retention clip.

11. The assembly of claim 8, wherein the catch further comprises a barb projected from the insertion portion of the retention clip; and the mating catch receiver further comprises a mating barb receiver positioned in the back plate between the pair of grooves of the clip receiver slot.

12. The assembly of claim 11, wherein the catch is further resiliently flexible relative to the insertion portion of the retention clip.

13. A side arm clamp assembly, comprising:

a molded body formed of a moldable material, the body comprising a clip receiver portion and a positioning portion, the receiver portion further comprising:

a pair of spaced-apart shoulders, a clip receiver slot comprising a pair of opposing substantially continuous spaced-apart grooves formed between the pair of spaced-apart shoulders, and each comprising an opening thereinto adjacent to an end of the receiver portion of the body distal from the positioning portion thereof, a flexibly resilient back plate formed between the shoulders with an interior surface thereof positioned adjacent to respective inner walls of the pair of spaced-apart grooves, and a catch flexibly projected from the back plate at least partially into a space between the spaced-apart grooves;

a substantially rigid retention clip comprising an insertion portion and a retention portion angularly projected therefrom adjacent to one end thereof, the insertion portion further comprising a pair of side tongue portions spaced-apart to be simultaneously slidingly received into the pair of spaced-apart grooves of the receiver slot, and a catch receiver spaced between the pair of side tongue portions and structured to substantially permanently interlockably receive thereinto at least a portion of the catch; and means for positioning the body relative to an electronics device mounting platform with the retention portion of the retention clip projected above a mounting surface thereof.

14. The assembly of claim 13, wherein the catch further comprises a barb having an approach portion intersecting the interior surface of the back plate adjacent to the openings into the grooves and inclined away from the interior surface of the back plate and into the space between the grooves; and the catch receiver of the retention clip further comprises a barb receiver formed therein.

15. The assembly of claim 14, wherein the molded body further comprises a substantially linear body comprising the clip receiver and positioning portions being substantially linearly aligned.

16. The assembly of claim 14, wherein the clip receiver portion of the molded body further comprises a pair of opposing reliefs molded between the back plate and respective spaced-apart shoulders.

* * * * *